Figure 1:
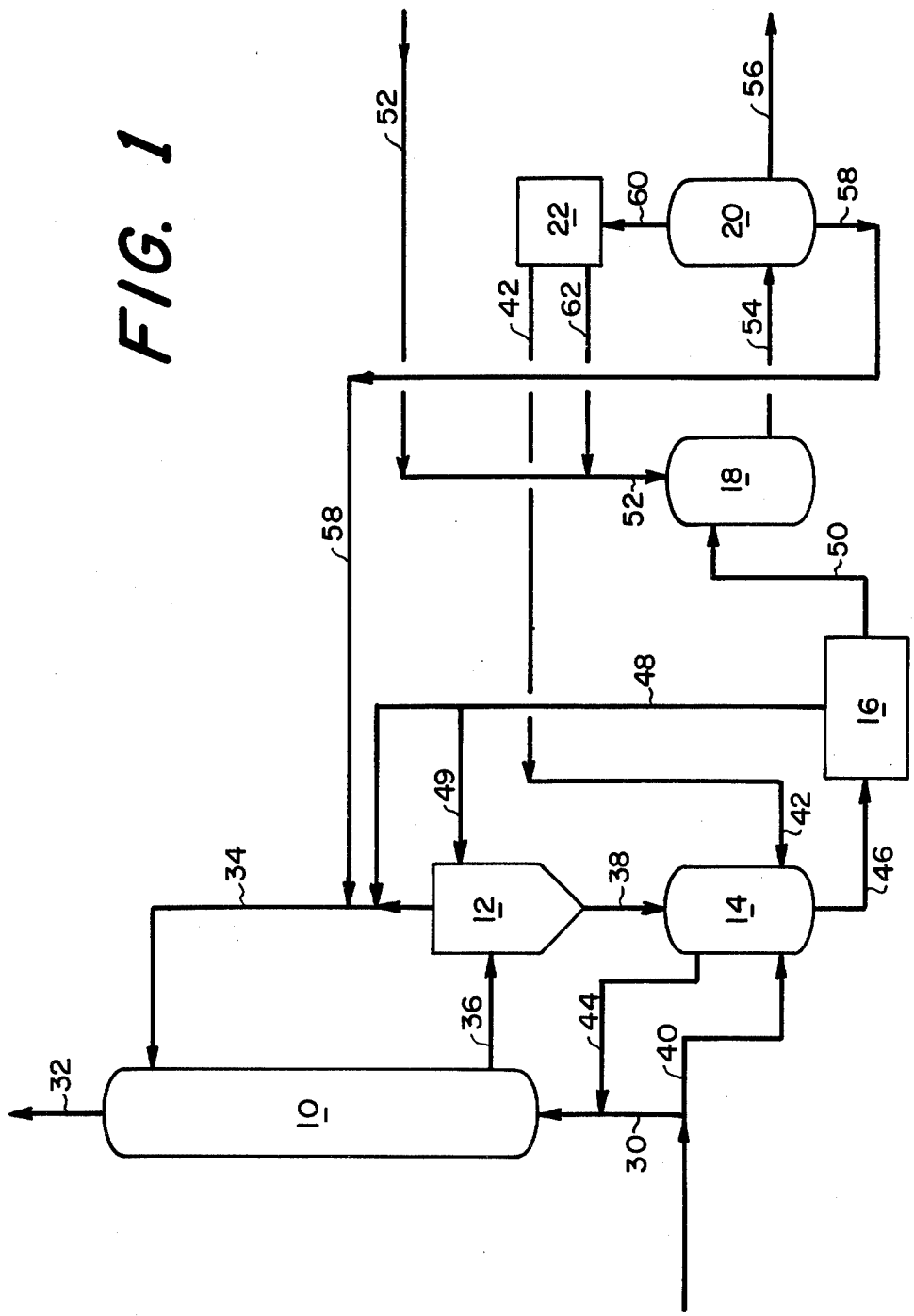

United States Patent [19]

Kulik

[11] 4,164,554

[45] Aug. 14, 1979

[54] METHOD FOR CONVERTING CALCIUM SULFOXY COMPOUNDS INTO CALCIUM CARBONATE COMPOUNDS

[75] Inventor: Metro D. Kulik, Pittsburgh, Pa.

[73] Assignee: Continental Oil Company, Stamford, Conn.

[21] Appl. No.: 966,543

[22] Filed: Dec. 5, 1978

[51] Int. Cl.$^2$ .............................................. C01B 17/04
[52] U.S. Cl. ............................... 423/567 A; 423/242; 423/431; 423/512 A; 423/571
[58] Field of Search ............ 423/242, 165, 431, 512 A, 423/548, 567, 571

[56] References Cited

U.S. PATENT DOCUMENTS

| | | | |
|---|---|---|---|
| 2,073,039 | 3/1937 | Wilton et al. | 423/242 A |
| 3,687,620 | 8/1972 | Witte et al. | 423/548 |
| 3,714,338 | 1/1973 | Urban | 423/571 |
| 3,846,535 | 11/1974 | Fonseca | 423/242 A |
| 3,904,743 | 9/1975 | Urban | 423/567 |
| 4,060,588 | 11/1977 | Mandelik | 423/431 X |

Primary Examiner—G. O. Peters
Attorney, Agent, or Firm—F. Lindsey Scott; William A. Mikesell, Jr.

[57] ABSTRACT

A method for converting calcium sulfoxy compounds selected from the group consisting of $CaSO_x$ and $Ca(HSO_x)_2$ where x is 3 or 4, into calcium carbonate by a method consisting essentially of: (a) converting the $Ca(HSO_x)_2$ compounds into $CaSO_x$ compounds by reacting the $CA(HSO_x)_2$ compounds with $CaCO_3$ in the presence of water; (b) reacting the $CaSO_x$ compounds with $NH_3$ and $CO_2$ in the presence of water to produce $NH_4HSO_x$ and $CaCO_3$; (c) separating the $NH_4HSO_x$ and $CaCO_3$; (d) reacting the $NH_4HSO_x$ with $H_2S$ to produce ammonium polysulfide $(NH_4)_2S_\omega$ wherein $\omega$ is from 1 to about 4; (e) decomposing the ammonium polysulfide to produce $NH_3$, $H_2S$, elemental sulfur and water; and (f) recovering the elemental sulfur from the $NH_3$, $H_2S$ and water.

7 Claims, 2 Drawing Figures

METHOD FOR CONVERTING CALCIUM SULFOXY COMPOUNDS INTO CALCIUM CARBONATE COMPOUNDS

This invention relates to the conversion of calcium sulfoxy compounds into calcium carbonate.

This invention also relates to processes wherein calcium carbonate is used to absorb sulfur oxides from gaseous streams.

This invention also relates to a process wherein calcium sulfoxy salts produced by the absorption of $SO_2$ with calcium carbonate are converted to yield elemental sulfur.

This invention further relates to processes wherein calcium carbonate is used to absorb sulfur compounds from gaseous streams wherein the calcium sulfoxy compounds so produced are converted into calcium carbonate for recycle to the sulfur absorption zone.

As a result of the continuing concern over the pollution of the environment with sulfur oxides resulting from the combustion of sulfur-containing carbonaceous fuels and the like, an increasing effort has been directed to the development of new and improved methods for removing sulfur oxides from the gaseous mixtures so produced. Typically, such gaseous mixtures are produced by the combustion of fuels such as petroleum oils, coal and the like. In one method for removing sulfur oxides from such gaseous mixtures, the gaseous mixtures are countercurrently contacted with a downwardly moving aqueous stream containing calcium carbonate. The sulfur oxides are absorbed from the gaseous mixture by the calcium carbonate to produce calcium sulfoxy compounds. The calcium sulfoxy compounds commonly produced are $CaSO_3$, $CaSO_4$, $Ca(HSO_3)_2$, $Ca(HSO_4)_2$ and the like. Heretofore the calcium sulfoxy compounds so produced have been used for land fill, wallboard filler and the like. The continuing use of such processes has begun to result in the accumulation of substantial quantities of calcium sulfoxy compounds which are of little value and in some instances create serious disposal problems. As a result, a continuing effort has been directed to the development of methods whereby such calcium sulfoxy compounds can be converted into calcium carbonate for recycle to the absorption process. It has now been found that such calcium sulfoxy compounds are readily converted to calcium carbonate and elemental sulfur by a method which comprises (a) converting $Ca(HSO_x)_2$ compounds into $CaSO_x$ compounds by reacting said $Ca(HSO_x)_2$ compounds wherein x is 3 or 4 with $CaCO_3$ in the presence of water;

(b) reacting $CaSO_x$ compounds with $NH_3$ and $CO_2$ in the presence of water to produce $NH_4HSO_x$ wherein x is 3 or 4 and $CaCO_3$;

(c) separating said $NH_4HSO_x$ and said $CaCO_3$;

(d) reacting said $NH_4HSO_x$ with $H_2S$ to produce ammonium polysulfide at a temperature from about 200° to about 700° F.;

(e) decomposing said ammonium polysulfide to produce $NH_3$, $H_2S$, elemental sulfur and water; and (f) recovering said elemental sulfur from said $NH_3$, $H_2S$ and water.

Figure 2:
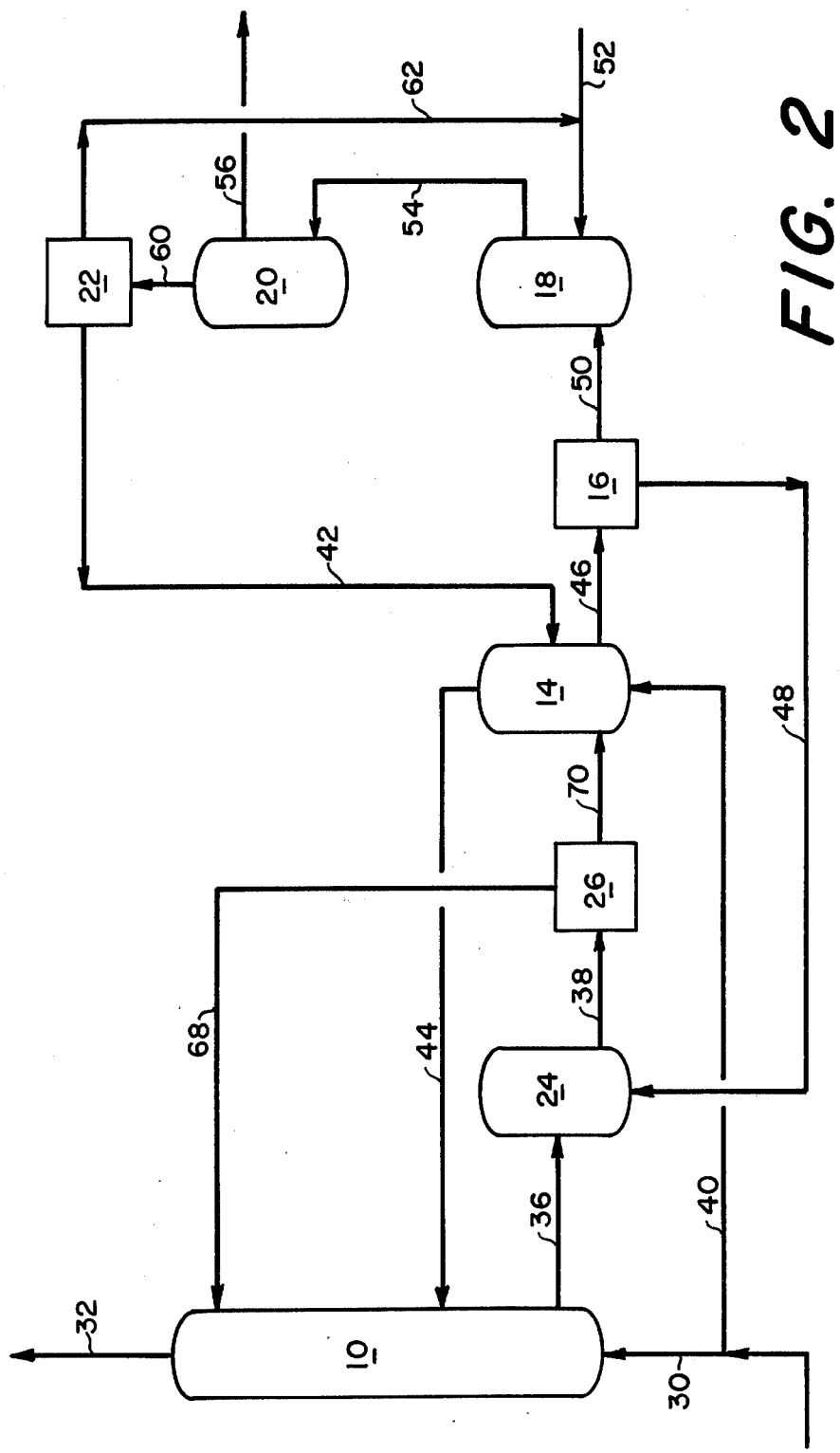

FIG. 1 is a schematic diagram of a process embodying the method of the present invention wherein calcium carbonate is used in a scrubbing vessel to remove sulfur oxides from a gaseous mixture; and FIG. 2 is schematic diagram of a process embodying the method of the present invention wherein alkali metal carbonates more soluble than $CaCO_3$ are utilized in the scrubbing vessel.

In the description of the drawings, the same numbers will be used throughout to refer to the same or similar components.

In FIG. 1, a scrubber 10 having a flue gas inlet 30 and a desulfurized gas outlet 32 is shown. The flue gas entering scrubber 10 through line 30 typically contains carbon dioxide, sulfur oxides and the like as produced by the combustion of sulfur-containing carbonaceous fuels. Scrubber 10 is also equipped with an inlet line 34 for introducing an aqueous slurry of calcium carbonate into an upper section of scrubber 10 and a line 36 for recovering a mixture which comprises calcium sulfoxy compounds, unreacted calcium carbonate and the like from a lower section of scrubber 10. The calcium sulfoxy compounds recovered through line 36 are passed to a decanter 12 wherein the calcium sulfoxy compounds are contacted with a calcium carbonate-containing stream introduced into decanter 12 through a line 49. The calcium carbonate introduced into decanter 12 through line 49 reacts with calcium sulfoxy compounds having the formula $Ca(HSO_x)_2$ to produce calcium sulfoxy compounds having a formula $CaSO_x$ which are relatively insoluble in aqueous solution and precipitate thus permitting their separation from the water present in vessel 12. The precipitated calcium sulfoxy compounds which have the formula $CaSO_x$ are then passed from decanter 12 through a line 38 to a reactor 14. The water recovered from decanter 12 is recycled through a line 34 to form a part of the inlet stream to scrubber 10. In reactor 14, the calcium sulfoxy compounds are reacted with carbon dioxide and ammonia to produce compounds of the general formula $NH_4HSO_x$ and calcium carbonate. Ammonia is passed to reactor 14 via a line 42 with carbon dioxide contained in the flue gas being introduced into reactor 14 via a line 40. As shown, a portion of the flue gas stream is optionally used to supply the $CO_2$ charged to reactor 14. Such streams will normally contain small amounts of sulfur oxides but the presence of the sulfur oxides causes no problem since the sulfur oxides will be removed by reaction with the calcium carbonate in reactor 14 or in scrubber 10 since the offgases from reactor 14 are optionally recycled to scrubber 10. If desired, the carbon dioxide can be provided from the desulfurized gas stream exiting scrubber 10 via line 32. The $NH_4HSO_x$ compounds produced in reactor 14 are passed from reactor 14 via a line 46 along with the calcium carbonates so produced to a filter 16 where the calcium carbonate which is relatively insoluble in water is removed by filtration and passed through a line 48 to line 34 to form the charge to scrubber 10. As indicated previously, a portion of the calcium carbonate is removed via a line 49 and passed to decanter 12. The aqueous stream recovered from filter 16 through line 50 contains the $NH_4HSO_x$ compounds which are passed to a reactor 18. In reactor 18, the compounds are contacted with $H_2S$ which is introduced through a line 52 to produce compounds having the general formula $(NH_4)_2S_\omega$ which are then passed via a line 54 to a reactor 20 where the compounds are thermally decomposed to yield elemental sulfur, hydrogen sulfide and ammonia. Gaseous ammonia and hydrogen sulfide are recovered from reactor 20 via a line 60 and passed to an $H_2S/NH_3$ separator 22 (optionally a fractionating still or the like) where they are separated into an ammonia stream which is recovered through a line 42 and a hydrogen sulfide stream which is recovered through a line 62 and passed to line 52 where it forms a portion of the H₂S charge to reactor 18. Elemental sulfur is recovered from reactor 20 via a line 56 and water is recovered from reactor 20 through a line 58 and passed to the charge stream to scrubber 10.

By the process shown, the calcium carbonate is regenerated and recycled to the scrubbing vessel with no net loss of calcium compounds and sulfur is produced as a valuable byproduct. The sulfur produced can be sold as such or used to produce compounds commonly produced from sulfur as known to those in the art. A portion of the sulfur may be used to generate H₂S for introduction into reactor 18.

The process shown in FIG. 2 is similar to that shown in FIG. 1 except that the scrubbing solution used in scrubber 10 comprises alkali metal carbonates rather than calcium carbonate. As is known to those skilled in the art, certain advantages are accomplished by the use of alkali metal carbonates such as $Na_2CO_3$ or $K_2CO_3$ as opposed to calcium carbonate. In particular, the alkali metal carbonates are highly water soluble and do not result in the use of a slurry in the scrubbing vessel whereas the calcium carbonate is limitedly soluble in water and results in the use of a slurry in scrubber 10. The sulfur oxides are absorbed by the alkali metal carbonates to produce sulfoxy materials having the general formula $M_2SO_x$ wherein M designates an alkali metal selected from the group consisting of potassium and sodium. The alkali metal sulfoxy compounds are recovered from scrubber 10 through a line 36 and passed to a reactor 24. In reactor 24, the alkali metal sulfoxy compounds are contacted with calcium carbonate introduced through a line 48 to produce calcium sulfoxy compounds which are passed to a filter 26 and separated from the alkali metal carbonates produced in vessel 24. The calcium sulfoxy compounds are then passed from filter 26 to a reactor 14 with the remaining steps of the process shown in FIG. 2 being substantially the same as those shown in FIG. 1. The process also produces sulfur as a product and results in no substantial loss of either alkali metal or calcium as a process by-product.

The calcium sulfoxy compounds produced by the absorption of the sulfur oxides are typically of the general formula $CaSO_x$ and $Ca(HSO_x)_2$ wherein x is 3 or 4. In some instances, the sulfoxy compounds may be substantially of the form $CaSO_x$. In such instances, clearly it is not necessary to treat the stream with $CaCO_3$ to convert the sulfoxy compounds to $CaSO_x$. In most scrubbing operations, mixtures of sulfoxy compounds are produced, but the method set forth herein is effective when either or both types of sulfoxy compounds are produced. As is known to those skilled in the art, these compounds are produced in mixture by such processes. The calcium sulfoxy compounds of the formula $Ca(HSO_x)_2$ are converted to calcium sulfoxy compounds of the formula $CaSO_x$ by reaction with calcium carbonate in decanter 12 as shown below in equation (1).

$$Ca(HSO_x)_2 \text{O} + CaCO_3 \rightarrow 2CaSO_x + H_2CO_3 \qquad (1)$$

The reaction temperatures and pressures in decanter 12 are not particularly critical and normally the reactions in this vessel are conducted at any convenient temperature below about 80° C. and at any convenient pressure although pressures near atmospheric are preferred. In the event that elevated temperatures are used, it may be necessary to operate at an elevated pressure in order to minimize the loss of water. The $CaSO_x$ compounds so produced are removed by decantation and passed to reactor 14 where they are contacted with ammonia and carbon dioxide as shown below in equation (2) to produce ammonium sulfoxy compounds and calcium carbonate.

$$CaSO_x + NH_3 + CD_2 + H_2O \rightarrow NH_4HSO_x + CaCO_3 \qquad (2)$$

The calcium carbonate is substantially insoluble in water whereas the ammonium sulfoxy compounds are very soluble in water, thus the ammonium sulfoxy compounds and the calcium carbonate are readily separated by filtration with the calcium carbonate being recycled to the absorption process and the ammonium sulfoxy compounds being passed on to vessel 18. A reaction typical of the reaction in vessel 18 is shown below as equation (3) wherein the ammonium sulfoxy compounds are converted to ammonium polysulfides of the general formula $(NH_4)_2S_\omega$ wherein $\omega$ is desirably from about 1 to about 4 which are passed to reactor 20 where they are thermally decomposed as shown below in equation (4).

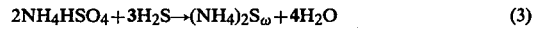

$$2NH_4HSO_4 + 3H_2S \rightarrow (NH_4)_2S_\omega + 4H_2O \qquad (3)$$

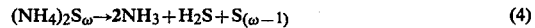

$$(NH_4)_2S_\omega \rightarrow 2NH_3 + H_2S + S_{(\omega-1)} \qquad (4)$$

Reaction conditions in vessel 14 are not particularly critical. In vessel 18, reaction conditions are typically from about 200° to about 700° F. at a pressure sufficient to maintain at least a portion of the water in the liquid phase. Desirably the temperature is from about 325° to about 600° F. with the pressure being from about 100 to about 3000 p.s.i.g. The product ammonium polysulfide is decomposed in vessel 20 at temperatures from about 250° to about 270° F. at any suitable pressure although high pressures are not favored. The elemental sulfur will exist as a liquid at this temperature and is desirably drawn off as such with the gaseous components being recovered overhead. In the variation of the process shown in FIG. 2, the alkali metal sulfoxy compounds which are desirably selected from sodium and potassium sulfoxy compounds having the general formula $M_2SO_x$ wherein M is selected from the group consisting of sodium and potassium and wherein x is 3 or 4 are produced by the absorption of sulfur oxides in an alkali metal carbonate solution. The alkali metal sulfoxy compounds are then reacted with calcium carbonate in vessel 24 to produce calcium sulfoxy compounds and alkali metal carbonate as shown below in equation (5).

$$M_2SO_x + CaCO_3 \rightarrow M_2CO_3 + CaSO_x \qquad (5)$$

The alkali metal carbonate so produced is recycled to scrubber 10. The reaction conditions in this vessel are not critical and may be selected as a function of the operating conditions in scrubber 10 and the like.

The operation of scrubber vessel 10 has not been described in detail since such vessels are well known to those skilled in the art with the primary requirement in such scrubbers being that intimate contact between the gas stream and the liquid absorber stream be accomplished to result in the removal of substantially all the sulfur oxides from the gaseous stream. The pH of the stream entering the upper portion of scrubber 10 should be above 7.0 and is desirably in the neighborhood of 9.0 to 9.5. The pH of the stream exiting scrubber 10 will be somewhat lower because of the absorbed acid gases and normally will be below 7.0. Typically, the pH will be from about 5.0 to about 6.0. As indicated above, the operation of such scrubbers is well known to those skilled in the art and need not be discussed further since the operation of the scrubber forms no part of the present invention which is directed primarily to the regeneration of the sulfoxy compounds produced by the absorption of the sulfur oxides.

Having thus described the present invention by reference to certain of its preferred embodiments, it is pointed out that the embodiments set forth, while preferred, are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, I claim:

1. A method for converting calcium sulfoxy compounds selected from the group consisting of $CaSO_x$ and $Ca(HSO_x)_2$ wherein x is 3 or 4 into calcium carbonate, said method consisting essentially of:
    (a) converting said $Ca(HSO_x)_2$ compounds into said $CaSO_x$ compounds by reacting said $Ca(HSO_x)_2$ compounds with $CaCO_3$ in the presence of water;
    (b) reacting said $CaSO_x$ compounds with $NH_3$ and $CO_2$ in the presence of water to produce $NH_4HSO_x$ wherein x is 3 or 4 and $CaCO_3$;
    (c) separating said $NH_4HSO_x$ and said $CaCO_3$;
    (d) reacting said $NH_4HSO_x$ with $H_2S$ to produce ammonium polysulfide;
    (e) decomposing said ammonium polysulfide to produce $NH_3$, $H_2S$, sulfur and water; and
    (f) recovering said sulfur from said $NH_3$, $H_2S$ and water.

2. The method of claim 1 wherein said $NH_3$ and $H_2S$ of step
    (f) are recovered and separated for recycle to steps (b) and (d) respectively.

3. The method of claim 1 wherein said calcium sulfoxy compounds are produced by the absorption of $SO_{(x-1)}$ wherein x is 3 or 4, from gaseous mixtures containing said $SO_{(x-1)}$ by contacting said mixtures with aqueous calcium carbonate compounds.

4. The method of claim 1 wherein said calcium sulfoxy compounds are produced by the absorption of $SO_{(x-1)}$ wherein x is 3 or 4, from gaseous mixtures containing said $SO_{(x-1)}$ by contacting said mixtures with an aqueous solution containing at least one alkali metal carbonate compound selected from the group consisting of $Na_2CO_3$, $NaHCO_3$, $K_2CO_3$ and $KHCO_3$ to produce at least one alkali metal sulfoxy compound selected from the group consisting of $K_2SO_x$, $KHSO_x$, $Na_2SO_x$, $NaHSO_x$ and mixtures thereof wherein x is 3 or 4, said alkali metal sulfoxy compound thereafter being reacted with aqueous $CaCO_3$ to produce said $CaSO_x$ compounds and at least one of said alkali metal carbonate compounds, said $CaSO_x$ compounds being separated from said alkali metal carbonate compound.

5. A method for removing sulfur oxides from gaseous mixtures containing said sulfur oxides, said method consisting essentially of:
    (a) contacting said gaseous mixtures with aqueous $CaCO_3$, to produce at least one calcium sulfoxy compound selected from the group consisting of $CaSO_x$ and $Ca(HSO_x)_2$ wherein x is 3 or 4 thereby removing said sulfur oxides from said mixtures;
    (b) converting said $Ca(HSO_x)_2$ compounds into said $CaSO_x$ compounds by reacting said $Ca(HSO_x)_2$ compounds with $CaCO_3$ in the presence of water;
    (c) reacting said $CaSO_x$ compounds with $NH_3$ and $CO_2$ in the presence of water to produce $NH_4HSO_x$ wherein x is 3 or 4 and $CaCO_3$;
    (d) separating said $NH_4HSO_x$ and said $CaCO_3$;
    (e) reacting said $NH_4HSO_x$ with $H_2S$ to produce ammonium polysulfide $(NH_4)_2S_\omega$ wherein $\omega$ is from 1 to about 4 at a temperature from about 200° to about 700° F.;
    (f) decomposing said ammonium polysulfide to produce $NH_3$, $H_2S$, sulfur and water, and
    (g) recovering said sulfur from said $NH_3$, $H_2S$ and water.

6. A method for removing sulfur oxides from gaseous mixtures containing said sulfur oxides, said method consisting essentially of:
    (a) contacting said gaseous mixtures with an aqueous solution containing at least one alkali metal carbonate compound selected from the group consisting of $NaHCO_3$, $Na_2CO_3$, $K_2CO_3$, $KHCO_3$, and mixtures thereof to produce at least one alkali metal sulfoxy compound selected from the group consisting of $Na_2SO_x$, $NaHSO_x$, $K_2SO_x$, $KHSO_x$ wherein x is 3 or 4, and mixtures thereof thereby removing said sulfur oxides from said mixture;
    (b) reacting said alkali metal sulfoxy compounds with aqueous $CaCO_3$ to produce said alkali metal carbonate compounds and $CaSO_x$ wherein x is 3 or 4;
    (c) separating said alkali metal carbonate compounds and said $CaSO_x$;
    (d) reacting said $CaSO_x$ compounds with $NH_3$ and $CO_2$ in the presence of water to produce $NH_4HSO_x$ wherein x is 3 or 4 and $CaCO_3$;
    (e) separating said $NH_4HSO_x$ and said $CaCO_3$;
    (f) reacting said $NH_4HSO_x$ with $H_2S$ to produce ammonium polysulfide $(NH_4)_2S_\omega$ wherein $\omega$ is from 1 to about 4 at a temperature from about 200° to about 700° F.;
    (g) decomposing said ammonium polysulfide to produce $NH_3$, $H_2S$, sulfur and water; and
    (h) recovering said sulfur from said $NH_3$, $H_2S$ and water.

7. A method for converting calcium sulfoxy compounds having a formula of $CaSO_x$ wherein x is 3 or 4 into calcium carbonate, said method consisting essentially of:
    (a) reacting said $CaSO_x$ compounds with $NH_3$ and $CO_2$ in the presence of water to produce $NH_4HSO_x$ wherein x is 3 or 4 and $CaCO_3$;
    (b) separating said $NH_4HSO_x$ and said $CaCO_3$;
    (c) reacting said $NH_4HSO_x$ with $H_2S$ to produce ammonium polysulfide;
    (d) decomposing said ammonium polysulfide to produce $NH_3$, $H_2S$, sulfur and water; and
    (e) recovering said sulfur from said $NH_3$, $H_2S$ and water.

* * * * *

UNITED STATES PATENT OFFICE
CERTIFICATE OF CORRECTION

PATENT NO. : 4,164,554
DATED : August 14, 1979
INVENTOR(S) : Metro D. Kulik

It is certified that error appears in the above-identified patent and that said Letters Patent are hereby corrected as shown below:

Col. 3, line 61: "$Ca(HSO_x)_{20}$" should read $Ca(HSO_x)_2$

Col. 4, line 9 : "$CD_2$" should read $CO_2$

Col. 6, line 16: "$H_sS$" should read $H_2S$

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*